United States Patent
Yamamoto

(10) Patent No.: US 8,993,655 B2
(45) Date of Patent: Mar. 31, 2015

(54) MASTERBATCH, AND METHOD OF PREPARING POLYAMIDE RESIN COMPOSITION USING MASTERBATCH

(75) Inventor: Takashi Yamamoto, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 43 days.

(21) Appl. No.: 14/001,000

(22) PCT Filed: Feb. 22, 2012

(86) PCT No.: PCT/JP2012/054328
§ 371 (c)(1),
(2), (4) Date: Aug. 22, 2013

(87) PCT Pub. No.: WO2012/115171
PCT Pub. Date: Aug. 30, 2012

(65) Prior Publication Data
US 2013/0331481 A1    Dec. 12, 2013

(30) Foreign Application Priority Data
Feb. 24, 2011    (JP) .................................. 2011-038167

(51) Int. Cl.
C08J 3/20    (2006.01)
C08J 3/22    (2006.01)
C08G 69/26    (2006.01)
C08L 77/06    (2006.01)
C08K 5/098    (2006.01)

(52) U.S. Cl.
CPC ................. C08J 3/22 (2013.01); C08G 69/265 (2013.01); C08L 77/06 (2013.01); C08K 5/098 (2013.01); C08J 2377/06 (2013.01); C08J 2477/06 (2013.01)
USPC ............................ 523/351; 524/394; 524/606

(58) Field of Classification Search
USPC .................... 523/351; 524/394, 606
See application file for complete search history.

(56) References Cited

U.S. PATENT DOCUMENTS

| | | |
|---|---|---|
| 3,872,055 A | 3/1975 | Furukawa et al. |
| 5,726,278 A | 3/1998 | Kenmochi |
| 2008/0039568 A1 | 2/2008 | Maruyama et al. |
| 2009/0239013 A1 | 9/2009 | Otaki et al. |
| 2009/0281210 A1 | 11/2009 | Aramaki |
| 2013/0065004 A1 | 3/2013 | Yamamoto et al. |
| 2013/0065005 A1 | 3/2013 | Yamamoto et al. |

FOREIGN PATENT DOCUMENTS

| | | |
|---|---|---|
| EP | 0 759 454 A1 | 2/1997 |
| JP | 4945960 B2 | 5/1974 |
| JP | 5-295129 A | 11/1993 |
| JP | 2001-164109 A | 6/2001 |
| JP | 2005-194328 A | 7/2005 |
| JP | 2005-194330 A | 7/2005 |
| JP | 2005-298546 A | 10/2005 |
| JP | 3808847 B2 | 5/2006 |
| JP | 2007-92053 A | 4/2007 |
| JP | 2007-92054 A | 4/2007 |
| JP | 2007-302880 A | 11/2007 |
| JP | 2010-280754 A | 12/2010 |
| JP | 4938950 B2 | 3/2012 |
| WO | WO 2005/063888 A1 | 7/2005 |

OTHER PUBLICATIONS

International Search Report issued May 29, 2012 in PCT/JP2012/054328.
Office Action issued Jul. 15, 2014 in Republic of Colombia Patent Application No. 13-188257- -2.

*Primary Examiner* — Edward Cain
(74) *Attorney, Agent, or Firm* — Oblon, McClelland, Maier & Neustadt, L.L.P.

(57) ABSTRACT

Capable of being provided are [1] a master batch comprising polyamide (X) comprising a diamine unit containing 70 mole % or more of a metaxylylenediamine unit and a dicarboxylic acid unit and an alkali compound (A), wherein an average particle diameter of the alkali compound (A) contained in the master batch is 50 μm or less; a contained number of particles having a particle diameter of exceeding 80 μm in 5 square millimeter of a cross section of the master batch is 1.5 particle or less; and a sum (m) of values obtained by multiplying a mole concentration of an alkali metal atom and a mole concentration of an alkaline earth metal atom each contained per g of the master batch by valencies thereof respectively is 60 μmol/g or more and 1710 μmol/g or less and [2] a production process for a polyamide resin composition prepared by making use of the master batch described in the above item [1]. Making use of the master batch of the present invention makes it possible to provide a polyamide resin composition which has a good appearance and a good color tone and which forms less gels in mold processing.

13 Claims, No Drawings

MASTERBATCH, AND METHOD OF PREPARING POLYAMIDE RESIN COMPOSITION USING MASTERBATCH

BACKGROUND OF THE INVENTION

The present invention relates to a master batch and a production process for a polyamide resin composition prepared by making use of the master batch, specifically to a master batch having an excellent molding processability suited to production of a polyamide resin composition which is industrially useful as a packaging material and a material for fibers and a production process for a polyamide resin composition prepared by making use of the master batch.

RELATED ART

Polyamide having a metaxylylene group in a polymer principal chain has a high rigidity and is widely used as a molding material, and in addition thereto, it is excellent as well in a performance of cutting off oxygen, carbon dioxide and the like and is also used as a gas barriering material for various packaging materials such as bottles, sheets, films and the like. Particularly in polyamide used for applications such as bottles, sheets, films, fibers and the like, attentions are paid to mixing of foreign matters. Due to that the molded and processed products are transparent and thin, that a high level and delicate mold processing technology is required and that foreign matters are very highly likely to damage the performances of the molded and processed products, mixing of foreign matters brings about the inferior appearance, an increase in a rate of generating defects such as breaking and the like attributable to foreign matter-generating sites and a reduction in the productivity.

Foreign matters originating in polyamide include powders called a fine, thin films called a froth, yellowed matters and carbides produced by thermal degradation, gelatinous matters and the like. It is the best countermeasure to inhibit the above foreign matters from being produced, but when they are inevitably produced, they have to be separated and removed from the pelletized products. The powders and the thin films are usually removed by wind selection, and the yellowed matters and the carbides can be removed by a screening equipment using an optical sensor. Various separating equipments are commercially available, and the sure removing effects can be expected.

On the other hand, gels are estimated to be produced due to that the molecules are damaged (the polymer molecules are degraded by radicals generated) during polymerization and mold processing to bring about abnormal reactions (turned into three-dimensional polymers) such as growing of non-linear molecules and the like and that they are turned into an extremely high molecular weigh as compared with those of other polyamide molecules. Accordingly, a thermal history has to be reduced to the utmost in the production step in order to obtain polyamide containing less gels, and measurements such as setting a balance of end group concentrations and adding a heat stabilizer or an antioxidant are carried out. However, some of the above additives show a catalytic effect to amidation reaction, and on the contrary, they expedite excessive polymerization reaction to bring about an increase in gels in a certain case. Accordingly, the reaction is carried out usually while maintaining a balance between promotion of the reaction and inhibition of forming gels by adding a specific amount of an alkali compound having further a reaction inhibitory effect.

Gels produced in a melt polymerization step can be removed by a filter and the like, but the gels are turned into fine particles by a flow pressure and pass through the filter in many cases. Further, gels are likely to be produced as well in solid phase polymerization carried out in producing high viscosity products, and therefore it is almost impossible to completely remove them.

Further, gels can be produced as well in melting in mold processing other than during production of polyamide. Even when used are polyamides in which a marked difference in a production amount of gels is not observed in evaluating a quality of the polyamides after production thereof, the difference is exerted in mold processing in a certain case, and a cause thereof is estimated to be attributable to that an excessive thermal history is applied to a part of the polymer in staying parts thereof such as screw grooves, a filter, a die and the like in mold processing. It can be found from the above matters that it is important for obtaining finally mold processed articles having less gels to produce polyamide having further less gels and a higher grade and design a mold processing apparatus having very small staying parts.

It is necessary for producing polyamide having further less gels to inhibit a thermal history in the production, set a balance between an effective concentration of an end group and an amount of a stabilizer and remove produced gels as well in melt polymerization and solid phase polymerization, but the effects thereof have been limited. Further, in designing a mold processing apparatus, it is possible to reduce formation of gels by subjecting, for example, metal parts which are brought into contact with the resin to plating treatment, but it is difficult in terms of constitution of the apparatus to completely eliminate the staying parts. Further, the respective molding apparatuses have to be subjected to the treatment, and it is lacking in the possibility thereof in terms of the versatility and the cost. Particularly in polyamide comprising a diamine component in which xylylenediamine is a principal component, radicals are liable to be produced in a benzylmethylene site of xylylenediamine, and production of gels provides more serious problems than in other polyamides.

Various methods for inhibiting gels of the polyamides described above from being formed are proposed. One of them includes a method in which an antioxidant and a reaction inhibitor are added, as described above, and in which a blend amount ratio of the respective additives is regulated, and disclosed are a method in which a phosphorus base compound as an antioxidant and an alkali metal salt as a reaction inhibitor are added in a fixed balance to thereby inhibit gels from being formed (refer to patent documents 1 and 2) and a method in which the contents of pyrophosphoric acid and other phosphorus base compounds in polyamide are regulated to inhibit formation of gels and generation of clogging a filter by adding the phosphorus base compounds (refer to patent documents 3 and 4). However, in the above methods in which the additives are blended in melt polymerization, increasing an addition amount of an alkali compound for the purpose of further increasing a gelation inhibiting effect results in increasing, as described above, a heat history due to a reduction in a polymerization speed and is likely to rather deteriorate a quality of the molded articles.

Proposed is a method which does not depend on an adding step, for example, a method in which 50 to 1000 ppm by weight of a phosphorus compound and a phosphinic compound or a phosphorous acid compound and 1 to 5 times mole of an alkali compound based on a concentration of phosphorus atoms contained are added to a molten resin before or after polymerization to thereby inhibit gels from being formed (refer to a patent document 5), but since a molding method described therein is conventionally carried out in spin molding and limited to processing under installation of a melt polymerization apparatus, it does not correspond to a method for obtaining practically and generally a good appearance and an excellent performance in an application for packaging materials such as films and the like.

On the other hand, proposed is a method in which a gelation inhibiting effect is obtained by blending an additive in mold processing of a film and the like. Disclosed is, for example, a method in which gels are inhibited from being formed by blending 0.0005 to 0.5 part by mass of at least one selected from a lubricant, an organic phosphorus base stabilizer, a hindered phenols compound and a hindered amines compound in subjecting polyamide to mold processing (refer to a patent document 6). However, the results described in the examples thereof are poor in effects when observing from the practical aspects, and in addition thereto, specific grounds of inhibiting formation of gels by the respective additives are scarcely referred to. Further, whitening and irregularities are likely to be generated on the molded articles in a certain case by short mixing or the excess addition amounts. Also, disclosed is a method in which fish eyes are inhibited from being formed by adding 0.001 to 0.015 part by mass of a higher fatty acid metal salt and a polyhydric alcohol compound for the purpose of enhancing a lubricity of polyamide to inhibit shearing heat from being generated in mold processing (refer to a patent document 7). However, addition of the higher fatty acid metal salt in a fixed amount or more is likely to reduce a print characteristic of polyamide and an adhesive property thereof with other films, and it is likely to damage performances thereof in applications for packaging materials in a certain case.

Patent document 1: Japanese Patent Application Laid-Open No. 194328/2005
Patent document 2: Japanese Patent Application Laid-Open No. 194330/2005
Patent document 3: Japanese Patent Application Laid-Open No. 92053/2007
Patent document 4: Japanese Patent Application Laid-Open No.
Patent document 5: Japanese Patent Application Laid-Open No. 38950/1974
Patent document 6: Japanese Patent Application Laid-Open No. 164109/2001
Patent document 8: Japanese Patent No. 3808847

Regardless of the methods described above, conventional gelation inhibiting methods require a balance of a blend ratio of an antioxidant to a reaction inhibiting agent, and the respective addition amounts are limited. On the other hand, in blending additives in mold processing, a gelation inhibiting effect is unsatisfactory in a certain case, or the addition amounts thereof are restricted so that an influence is not exerted on the physical properties thereof. Accordingly, the effective gel formation inhibiting action has not been obtained.

An object of the present invention is to solve the problems described above and provide a master batch which is suited to production of polyamide having a good appearance and a good color tone and forming less gelatinous substances in mold processing and which is excellent in a molding processability and a production process for a polyamide resin composition making use of the above master batch.

The present invention provides a master batch shown below and a production process for a polyamide resin composition making use of the above master batch.

[1] A master batch comprising polyamide (X) comprising a diamine unit containing 70 mole % or more of a metaxylylenediamine unit and a dicarboxylic acid unit and an alkali compound (A), wherein an average particle diameter of the alkali compound (A) contained in the master batch is 50 μm or less; a contained number of particles having a particle diameter of exceeding 80 μm in 5 square millimeter of a cross section of the master batch is 1.5 particle or less; and a sum (m) of values obtained by multiplying a mole concentration of an alkali metal atom and a mole concentration of an alkaline earth metal atom each contained per g of the master batch by valencies thereof respectively is 60 μmol/g or more and 1710 μmol/g or less.

[2] A production process for a polyamide resin composition making use of the master batch according to the above item [1], comprising:
(a) a step in which diamine containing 70 mole % or more of metaxylylenediamine and dicarboxylic acid are subjected to polycondensation under the presence of an alkali metal compound (C) and a phosphorus atom-containing compound (B) to obtain polyamide (X),
(b) a step in which 14 to 0.5 part by mass of a raw material alkali compound (A) and 100 parts by mass of the polyamide (X) obtained in the step (a) described above are molten and kneaded by means of an extrusion equipment to obtain a master batch containing the polyamide (X) and the alkali compound (A) and
(c) a step in which 0.5 to 20 parts by mass of the master batch obtained in the step (b) and 99.5 to 80 parts by mass of the polyamide (X) obtained in the step (a) are molten and kneaded by means of an extrusion g equipment.

According to the present invention, a polyamide resin composition which has a good appearance and a good color tone and which forms less gels in mold processing can be provided by making use of the above master batch.

MODE FOR CARRYING OUT THE INVENTION

<Master Batch>

The master batch of the present invention comprises polyamide (X) comprising a diamine unit containing 70 mole % or more of a metaxylylenediamine unit and a dicarboxylic acid unit and an alkali compound (A), wherein an average particle diameter of the alkali compound (A) contained in the master batch is 50 μm or less; a contained number of particles having a particle diameter of exceeding 80 μm in 5 square millimeter of a cross section of the master batch is 1.5 particle or less; and a sum (m) of values obtained by multiplying a mole concentration of an alkali metal atom and a mole concentration of an alkaline earth metal atom each contained per g of the master batch by valencies thereof respectively is 60 μmol/g or more and 1710 μmol/g or less.

The alkali compound is used, as described above, as a neutralizing agent for the phosphorus base compound added in the polymerization of the polyamide. However, a use amount thereof in the polymerization of the polyamide is limited from the viewpoint of a balance with the phosphorus base compound. Intense researches on the above matter repeated by the present inventors have resulted in finding that gels can be inhibited from being formed in the mold processing by adding the alkali compound (A) in the mold processing after polymerizing the polyamide to elevate a concentration of the alkali compound; an amount of the gels formed is small even if a staying situation of the molten polyamide continues over a long period of time; and a good molded article in which less gels are mixed is obtained.

On the other hand, there has been the problem that when the alkali compound is kneaded directly with the polyamide in the mold processing, the alkali compound is deposited on the molded article as a non-molten matter due to an inferior dispersibility of the alkali compound into the polyamide. Accordingly, the present inventors have found that making use of the master batch containing the alkali compound (A) having a specific particle size distribution makes it possible to satisfactorily disperse and melt the alkali compound into the polyamide and prevents a filter from being clogged in both cases of production and mold processing of the master batch even under the presence of the alkali compound having a high concentration and that a molded article on which whitening and irregularities are not generated and which is excellent in an appearance is obtained. The present invention has come to be achieved based on the above knowledge.

<Polyamide (X)>

The diamine unit constituting the polyamide (X) contains 70 mole % or more, preferably 80 mole % or more and more preferably 90 mole % or more of the metaxylylenediamine unit. If the metaxylylenediamine unit in the diamine unit accounts for 70 mole % or more, the polyamide (X) can exert an excellent gas barriering property.

Capable of being shown as the examples of compounds other than the metaxylylenediamine unit which can constitute the diamine are aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, 2,4,4-trimethyl-hexamethylenediamine and the like; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, bis(aminomethyl)tricyclodecane and the like; and diamines having aromatic rings, such as bis(4-aminophenyl)ether, paraphenylenediamine, paraxylylenediamine, bis(aminomethyl)naphthalene and the like. However, they shall not be restricted to the above compounds.

Capable of being shown as the examples of compounds which can constitute the dicarboxylic acid unit constituting the polyamide (X) are aliphatic dicarboxylic acids such as succinic acid, glutaric acid, pimelic acid, adipic acid, suberic acid, azelaic acid, sebacic acid, undecanoic diacid, dodecanoic diacid, dimer acid and the like; alicyclic dicarboxylic acids such as 1,4-cyclohexanedicarboxylic acid and the like; and aromatic dicarboxylic acids such as terephthalic acid, isophthalic acid, orthophthalic acid, xylylenedicarboxylic acid, naphthalenedicarboxylic acid and the like. However, they shall not be restricted to the above compounds.

Polyamide comprising a diamine unit containing 70 mole % or more of a metaxylylenediamine unit and a dicarboxylic acid unit containing 70 mole % or more, preferably 80 mole % or more and more preferably 90 mole % or more of an adipic acid unit can be shown as the example of the polyamide (X) which can be preferably used in the present invention. If 70 mole % or more of the adipic acid is contained in the dicarboxylic acid unit, a reduction in the gas barriering property and an excessive reduction in the crystallinity can be avoided. At least one of linear aliphatic α,ω-dicarboxylic acids having 4 to 20 carbon atoms is preferably used as a compound which can constitute the dicarboxylic acid unit other than the adipic acid unit.

Further, polyamide comprising a diamine unit containing 70 mole % or more of a metaxylylenediamine unit and a dicarboxylic acid unit containing 70 to 99 mole % of an adipic acid unit and 1 to 30 mole % of an isophthalic acid unit can also be shown as the example of the polyamide (X) which can be preferably used in the present invention. Addition of the isophthalic acid unit as the dicarboxylic acid unit makes it possible to reduce the melting point and lower the mold processing temperature and therefore makes it possible to reduce a thermal history and inhibit gels from being formed during molding the polyamide resin composition.

Further, polyamide comprising a diamine unit containing 70 mole % or more of a metaxylylenediamine unit and a dicarboxylic acid unit containing 70 mole % or more, preferably 80 mole % or more and more preferably 90 mole % or more of a sebacic acid unit can also be shown as the example of the polyamide (X) which can be preferably used in the present invention. If 70 mole % or more of the sebacic acid unit is contained in the dicarboxylic acid unit, a reduction in the gas barriering property and an excessive reduction in the crystallinity can be avoided. In addition thereto, the melting point can be reduced, and the mold processing temperature can be lowered. Further, gels can be inhibited from being formed. At least one of linear aliphatic α,ω-dicarboxylic acids having 4 to 20 carbon atoms is preferably used as a compound which can constitute the dicarboxylic acid unit other than the sebacic acid unit.

In addition to the diamines and the dicarboxylic acids each described above, lactams such as ε-caprolactam, laurolactam and the like, aliphatic aminocarboxylic acids such as aminocaproic acid, aminoundecanoic acid and the like and aromatic aminocarboxylic acids such as p-aminomethylbenzoic acid and the like can also be used as a copolymerization component for a component constituting the polyamide (X) as long as the effects of the present invention are not damaged.

A number average molecular weight of the polyamide (X) is preferably 10000 to 50000, more preferably 15000 to 45000 and further preferably 20000 to 40000, and it is suitably selected according to the uses and the molding method of the polyamide resin composition. In a case where the fluidity of some extent is required in the production, for example, a case of the use such as a film and the like, a number average molecular weight of the polyamide (X) is preferably 20000 to 30000. In a case where the melt strength is required in the production, for example, a case of the use such as a sheet and the like, a number average molecular weight of the polyamide (X) is preferably 30000 to 40000.

A number average molecular weight of the polyamide (X) is calculated from the following equation (4):

$$\text{number average molecular weight} = 2 \times 1000000/([COOH]+[NH_2]) \quad (4)$$

(wherein [COOH] represents a concentration (μmol/g) of an end carboxyl group in the polyamide (X), and [NH$_2$] represents a concentration (μmol/g) of an end amino group in the polyamide (X)).

In the present invention, a value calculated by dissolving the polyamide in a phenol/ethanol mixed solution and neutralizing and titrating the resulting solution with a diluted hydrochloric acid aqueous solution is used for the end amino group concentration, and a value calculated by dissolving the polyamide in benzyl alcohol and neutralizing and titrating the resulting solution with a sodium hydroxide aqueous solution is used for the end carboxyl group concentration.

<Alkali Compound (A)>

The master batch of the present invention contains the alkali compound (A) from the viewpoint of preventing gelation from being brought about in the mold processing.

The preferred specific examples of the alkali compound (A) used in the present invention include hydroxides, hydrides, alkoxides, carbonates, hydrogencarbonates and carboxylates of alkali metals and alkaline earth metals, but they shall not specifically be restricted to the above compounds. The preferred specific examples of the alkali metals and the alkaline earth metals include sodium, potassium, lithium, rubidium, cesium, magnesium, calcium and the like.

The hydroxides of the alkali metals and the alkaline earth metals include, for example, lithium hydroxide, sodium hydroxide, potassium hydroxide, rubidium hydroxide, cesium hydroxide, magnesium hydroxide, calcium hydroxide and the like.

The hydrides of the alkali metals and the alkaline earth metals include, for example, lithium hydride, sodium hydride, potassium hydride and the like.

The alkali metal alkoxides and the alkaline earth metal alkoxides are preferably alkoxides thereof having 1 to 4 carbon atoms and include, for example, sodium methoxide, potassium methoxide, lithium methoxide, magnesium methoxide, calcium methoxide, sodium ethoxide, potassium ethoxide, lithium ethoxide, magnesium ethoxide, calcium ethoxide, sodium t-butoxide, potassium t-butoxide, lithium t-butoxide, magnesium t-butoxide, calcium t-butoxide and the like.

The carbonates and the hydrogencarbonates of the alkali metals and the alkaline earth metals include, for example, sodium carbonate, sodium bicarbonate, potassium carbonate, potassium bicarbonate, lithium carbonate, calcium carbonate, magnesium carbonate, sodium hydrogencarbonate, calcium hydrogencarbonate and the like, and anhydrous salts thereof are preferred.

The carboxylates of the alkali metals and the alkaline earth metals are preferably carboxylates thereof having 1 to 10 carbon atoms, and anhydrous salts thereof are preferred. The specific examples of the carboxylic acids include, for example, linear saturated fatty acids such as formic acid, acetic acid, propionic acid, butyric acid, valeric acid, caproic acid, enanthic acid, capric acid, pelargonic acid, lauric acid, myristic acid, palmitic acid, stearic acid, eicosanoic acid, behenic acid, montanic acid, triacontanoic acid and the like; fatty acid derivatives such as 12-hydroxystearic acid and the like; aliphatic dicarboxylic acids such as oxalic acid, fumaric acid, maleic acid, succinic acid, glutaric acid, adipic acid, pimelic acid, suberic acid, azelaic acid, sebacic acid, undecanoic diacid, dodecanoic diacid and the like; hydroxy acids such as glycolic acid, lactic acid, hydroxybutyric acid, tartaric acid, malic acid, citric acid, isocitric acid, mevalonic acid and the like; and aromatic carboxylic acids such as benzoic acid, terephthalic acid, isophthalic acid, orthophthalic acid, pyromellitic acid, trimellitic acid, xylylenedicarboxylic acid, naphthalenedicarboxylic acid and the like.

The alkali compound (A) used in the present invention may be used in a single kind of the compounds described above or in combination of two or more kinds thereof. Among the compounds described above, the alkali metal salts of carboxylic acids having 10 or less carbon atoms are preferred from the viewpoints of a dispersibility thereof in the polyamide (X) and a gelation inhibiting effect, and sodium acetate is more preferred from the viewpoints of an economical efficiency and a gelation inhibiting effect.

Since the alkali compound (A) used in the present invention is dispersed evenly in the polyamide resin composition, it is preferably a fine powder, and coagulated matters and substances having an excessively large particle size are preferably decreased to the utmost.

From the above viewpoints, an average particle diameter of the alkali compound (A) (hereinafter called the raw material alkali compound (A)) which is the raw material before added to the master batch of the present invention is preferably 150 µm or less, more preferably 120 µm or less. An average particle diameter of the raw material alkali compound (A) is a value shown by an average particle diameter determined by measuring a volume distribution thereof by a laser diffraction scattering method and arithmetically calculating it.

Further, a proportion in which particles having a particle diameter of 300 µm or more are contained in the raw material alkali compound (A) is preferably 5% or less. When a proportion in which the particles having a particle diameter of 300 µm or more are contained is 5% or less, the alkali compound (A) contained in the molded article can be inhibited from being deposited.

Commercially available compounds can be used as the raw material alkali compound (A) in the present invention. In a case of, for example, commercially available sodium acetate, an average particle diameter thereof is 100 µm to 1 mm, and a proportion in which particles having a particle diameter of 300 µm or more are contained is 1 or less to 100%. Commercially available alkali compounds are subjected, if necessary, to crushing treatment to control an average particle diameter and a particle size distribution thereof so that they fall in the preferred ranges described above, and they can be used as the alkali compound (A). Or, commercially available alkali compounds in which an average particle diameter and a particle size distribution thereof fall in the preferred ranges described above can be used as they are.

Methods carried out by using, for example, a pin mill, a hammer mill, a blade mill, a ball mill, a high pressure crushing mill, a jet mill and the like can be used as a crushing method used in subjecting the alkali compounds such as commercially available sodium acetate and the like shown as the examples described above to crushing treatment. Any of publicly known methods can be applied as long as the targeted average particle diameter and particle size distribution can be achieved.

The master batch of the present invention is obtained by kneading the raw material alkali compound (A) and the polyamide. A size of the particles of the alkali compound (A) present in the master batch obtained can be measured by observing a cross section of the master batch by means of a scanning type microscope (SEM).

A method for exposing a cross section of the master batch in order to observe the alkali compound (A) present in the master batch includes a method in which the master batch is embedded in a resin such as an epoxy resin and the like and in which a cross section thereof is then exposed by dry polishing or wet polishing. Also, a cross section of the master batch can be exposed as well by means of a microtome and a diamond knife.

In the present invention, an average particle diameter of the alkali compound (A) contained in the master batch is calculated by observing the above exposed cross section of the master batch by means of a scanning type microscope (SEM) to select a range in which 1000 particles or more of the alkali compound (A) are contained in the same plain surface and subject it to binarization treatment, then further selecting a region of 5 square millimeter in the above range to calculate an average particle diameter of the respective particle images present in the above region in terms of an area proportion and setting a value thereof to an average particle diameter of the alkali compound (A) contained in the master batch.

An average particle diameter of the alkali compound (A) contained in the master batch which is calculated by the calculating method described above is preferably 50 µm or less, preferably 45 µm or less, more preferably 40 µm or less and further preferably 20 µm or less. If an average particle diameter of the alkali compound (A) contained in the master batch is controlled to the ranges described above, the resin pressure is inhibited from being elevated in subjecting the polyamide resin composition to mold processing to make it possible to enhance the productivity to a large extent. Further, irregularities in the mold-processed article are prevented from being generated to provide the article with a good appearance, and the secondary processability such as stretching and the like is improved as well. A lower limit of the alkali compound (A) shall not specifically be restricted, and it is 0.1 μm or more which makes practically preparation possible.

Further, in the master batch of the present invention, the contained number of the particles having a particle diameter of exceeding 80 μm in a region of 5 square millimeter in a cross section of the master batch in which the average particle diameter has been calculated in the manner described above is preferably 1.5 particle or less, more preferably 0.5 particle or less, further preferably 0.4 particle or less, particularly preferably 0.3 particle or less and most preferably 0.1 particle or less. Controlling the contained number of the particles having a particle diameter of exceeding 80 μm in a region of 5 square millimeter in a cross section of the master batch to ranges described above makes it possible to effectively inhibit a rise in the resin pressure in molding and generation of irregularities in the molded article.

The particle diameter referred to herein means a particle diameter obtained by measuring a major diameter (the longest part) of the alkali compound (A). Further, the contained number of the particles having a particle diameter of exceeding 80 μm in a region of 5 square millimeter in a cross section of the master batch is obtained by counting the contained number of the particles having a particle diameter of exceeding 80 μm in a region of 5 square millimeter in a cross section of the master batch by every separate pellet and calculating an average contained number thereof. The number of the pellets used for the measurement shall not be restricted, and a method in which the measurement is carried out by using, for example, 5 or more pellets is preferred.

A sum (hereinafter referred to as "a total mole concentration of an alkali metal atom and an alkaline earth metal atom") m of values obtained by multiplying a mole concentration of an alkali metal atom and a mole concentration of an alkaline earth metal atom each contained per g of the master batch of the present invention by valencies thereof respectively is 60 to 1710 μmol/g, preferably 90 to 1450 μmol/g, more preferably 120 to 1220 μmol/g and further preferably 240 to 860 μmol/g from the viewpoints of preventing deposits from being formed in the mold processing making use of the master batch. If a total mole concentration of an alkali metal atom and an alkaline earth metal atom each contained in the master batch is less than 60 μmol/g, a blend amount of the master batch based on the polyamide is increased in the mold processing, and the molding processability is damaged in a certain case by a reduction in the melt viscosity. Also, if a total mole concentration of an alkali metal atom and an alkaline earth metal atom is larger than 1710 μmol/g, a reduction in a melt viscosity of the master batch itself is likely to be brought about, and production of the master batch is likely to become difficult. In addition thereto, the master batch is unevenly dispersed in the polyamide to bring about a state in which the alkali compound (A) is present locally in the polyamide resin composition, and no satisfactory gel inhibiting effect is likely to be obtained.

In the present invention, making use of the master batch prepared by melting and kneading the polyamide (X) containing a fixed amount of moisture as the raw material polyamide (X) used for the master batch and the alkali compound (A) makes it possible to sufficiently disperse and melt the alkali compound (A) into the molded article and makes it possible to provide a molded article which is molded at a stable moldability and prevented from generating whitening and irregularities and which is excellent in an appearance.

In the present invention, a moisture content contained in the raw material polyamide (X) is preferably 0.1 to 0.8% by mass. If a moisture content of the raw material polyamide (X) is 0.1% by mass or more, the alkali compound (A) is sufficiently dispersed and molten into the polyamide (X), and a rise in the resin pressure in molding and generation of irregularities in the molded article are inhibited. If the moisture content is 0.8% by mass or less, inhibited is a phenomenon in which the alkali compound (A) is unstably supplied by generation of a large amount of vapor in supplying the raw material alkali compound (A) and the raw material polyamide (X) to a molding equipment.

The master batch of the present invention can be blended with at least one or a plurality of other reins such as nylon 6, nylon 66, nylon 66,6, polyesters, polyolefins, phenoxy resins and the like as long as the purpose is not damaged. Further, capable of being added are inorganic fillers such as glass fibers, carbon fibers and the like; tabular inorganic fillers such as glass flakes, talc, kaolin, mica, montmorillonite, organic clays and the like; impact resistant modifying materials such as various elastomers and the like; crystal nucleus agents; lubricants such as fatty acid amide base lubricants, fatty acid amide base compounds and the like; antioxidants such as copper compounds, organic or inorganic halogen base compounds, hindered phenol base antioxidants, hindered amine base antioxidants, hydrazine base antioxidants, sulfur base compounds, phosphorus base compounds and the like; coloring inhibitors; UV absorbers such as benzotriazole base compounds and the like; additives such as mold releasing agents, plasticizers, colorants, flame retardants and the like; and additives such as compounds containing cobalt metal, benzoquinones, anthraquinones and naphthoquinones which are compounds providing an oxygen scavenging ability.

A form of the master batch of the present invention is preferably any of a pellet form, a powder from and a flake form, and the master batch of a pellet form is particularly preferred since it is excellent in a handling-property.

Production Process of Polyamide Resin Composition:

The polyamide resin composition obtained by using the master batch of the present invention can be produced by a process comprising the following steps (a) to (c):

a step (a): a step in which diamine containing 70 mole % or more of metaxylylenediamine and dicarboxylic acid are subjected to polycondensation under the presence of an alkali metal compound (C) and a phosphorus atom-containing compound (B) to obtain the polyamide (X), a step (b): a step in which the raw material alkali compound (A) is added to the polyamide (X) obtained in the step (a) described above to obtain the master batch and a step (c) in which the master batch obtained in the step (b) is added to the polyamide (X) obtained in the step (a) to obtain the polyamide resin composition.

<Step (a)>

The step (a) is a step in which diamine containing 70 mole % or more of metaxylylenediamine and dicarboxylic acid are subjected to polycondensation under the presence of the alkali metal compound (C) and the phosphorus atom-containing compound (B) to obtain the polyamide (X). Obtaining the polyamide (X) by carrying out the polycondensation under the presence of the alkali metal compound (C) and the phosphorus atom-containing compound (B) makes it possible to enhance the processing stability in the melt molding and prevent the polyamide (X) from being colored. Further, allowing the alkali metal compound (C) to be coexistent makes it possible to inhibit the excessive polymerization from being brought about by the phosphorus atom-containing compound (B).

The preferred specific examples of the phosphorus atom-containing compound (B) include hypophosphorous acid compounds (called as well phosphinic acid compounds or phosphinous acid compounds), phosphorous acid compounds (called as well phosphonic acid compounds) and the like, but they shall not specifically be restricted to the above compounds. The phosphorus atom-containing compound (B) may be a metal salt or an alkali metal salt.

The specific examples of the hypophosphorous acid compounds include hypophosphorous acid; hypophosphorous acid metal salts such as sodium hypophosphite, potassium hypophosphite, lithium hypophosphite and the like; hypophosphorous acid compounds such as ethyl hypophosphite, dimethylphosphinic acid, phenyl methyl phosphinate, phenyl phosphinate, ethyl phenylphosphinate and the like; and phenylphosphinous acid metal salts such as sodium phenylphosphinate, potassium phenylphosphinate, lithium phenylphosphinate and the like.

The specific examples of the phosphorous acid compounds include phosphorous acid and pyrophosphorous acid; phosphorous acid metal salts such as sodium hydrogenphosphite, sodium phosphite and the like; phosphorous acid compounds such as triethyl phosphite, triphenyl phosphite, ethylphosphonic acid, phenylphosphonic acid, diethyl phenylphosphonate and the like; and phenylphosphonic acid metal salts such as sodium ethylphosphonate, potassium ethylphosphonate, sodium phenylphosphonate, potassium phenylphosphonate, lithium phenylphosphonate and the like.

The phosphorus atom-containing compound (B) may be used in a single kind of the compounds described above or in combination of two or more kinds thereof. Among the compounds described above, hypophosphorous acid metal salts such as sodium hypophosphite, potassium hypophosphite, lithium hypophosphite and the like are preferred from the viewpoints of an effect of accelerating the polymerization reaction of the polyamide (X) and an effect of preventing the coloring, and sodium hypophosphite is more preferred.

The polycondensation for the polyamide (X) is carried out preferably under the presence of the phosphorus atom-containing compound (B) and the alkali metal compound (C). A sufficiently large amount of the phosphorus atom-containing compound (B) has to be added in order to prevent the polyamide (X) from being colored during the polycondensation, but if a use amount of the phosphorus atom-containing compound (B) is too large, the amidation reaction rate is accelerated too much, and gelation of the polyamide (X) is likely to be brought about. Accordingly, the alkali metal compound (C) is preferably allowed to be coexistent from the viewpoint of controlling the amidation reaction rate.

The alkali metal compound (C) shall not specifically be restricted, and alkali metal hydroxides and alkali metal acetic acid salts can be listed as the preferred specific examples thereof. Lithium hydroxide, sodium hydroxide, potassium hydroxide, rubidium hydroxide and cesium hydroxide can be listed as the alkali metal hydroxides, and lithium acetate, sodium acetate, potassium acetate, rubidium acetate and cesium acetate can be listed as the alkali metal acetic acid salts.

When the alkali metal compound (C) is used in obtaining the polyamide (X) by polycondensation, a use amount of the alkali metal compound (C) falls in a range of preferably 0.5 to 1, more preferably 0.55 to 0.95 and further preferably 0.6 to 0.9 in terms of a value obtained by dividing a mole number of the alkali metal compound (C) by a mole number of the phosphorus atom-containing compound (B) from the viewpoint of inhibiting gels from being formed.

The production process for the polyamide (X) shall not specifically be restricted as long as it is carried out under the presence of the phosphorus atom-containing compound (B) and the alkali metal compound (C), and it can be carried out by an optional method on optional polymerization conditions. The polyamide (X) can be produced, for example, by heating a nylon salt comprising a diamine component (for example, metaxylylenediamine) and a dicarboxylic acid component (for example, adipic acid) under the presence of water in a pressurizing state to polymerize them in a melting state while removing added water and condensation water.

Further, the polyamide (X) can be produced as well by a method in which the diamine component (for example, metaxylylenediamine) is added directly to the dicarboxylic acid component (for example, adipic acid) staying in a melting state to subject them to polycondensation under an atmospheric pressure. In the above case, the diamine component is continuously added to the dicarboxylic acid component in order to maintain the reaction system in an even liquid state, and during that time, the polycondensation is promoted while heating the reaction system so that the reaction temperature is not lower than the melting points of oligoamide and polyamide each produced.

A small amount of monoamine and monocarboxylic acid may be added as a molecular weight controlling agent in the polycondensation for the polyamide (X).

Further, the polycondensation may be carried out for the polyamide (X) by carrying out solid phase polymerization after produced by a melt polymerization method. The solid phase polymerization shall not specifically be restricted, and it can be carried out by an optional method on optional polymerization conditions.

<Step (b)>

The step (b) is a step in which the raw material alkali compound (A) is added to the polyamide (X) obtained in the step (a) described above to obtain the master batch containing the polyamide (X) and the alkali compound (A).

In the present invention, the master batch is obtained by melting and kneading the polyamide (X) and the raw material alkali compound (A) by means of an extruding equipment. Also in adding the alkali compound directly to the polyamide (X) to subject the mixture to mold processing, the gelation inhibiting effect is obtained, but since the alkali compound is low in a dispersibility and a solubility in the polyamide (X), an abnormal rise in the resin pressure due to clogging of the filter in molding or deposition of a non-molten matter of the alkali compound on the molded article is brought about in a certain case. Accordingly, a molding processability of the polyamide is stabilized in the present invention by using the master batch containing the polyamide (X) and the alkali compound (A).

In the present invention, the master batch is added by melting and kneading the polyamide (X) and the raw material alkali compound (A), and optional extrusion equipments such as a batch system kneading equipment, a kneader, a cokneader, a planetary extrusion equipment, a single shaft or double shaft extrusion equipment and the like can be used as the extrusion equipment. Among them, the single shaft extrusion equipment and the double shaft extrusion equipment are preferably used from the viewpoints of a kneading ability and a productivity.

Means for supplying the polyamide (X) and the raw material alkali compound (A) to the extrusion equipment shall not specifically be restricted, and a belt feeder, a screw feeder, a vibration feeder and the like can be used therefor. The polyamide (X) and the raw material alkali compound (A) may be supplied respectively by means of independent feeders or may be supplied after dry-blended.

In the dry-blending, in order to prevent separation of the polyamide (X) from the raw material alkali compound (A) after dry-blended, a viscous liquid may be adhered as a spreading agent to the polyamide (X), and then the alkali compound (A) may be added and mixed therewith. The spreading agent shall not specifically be restricted, and surfactants and the like can be used.

In melting and kneading the polyamide (X) and the raw material alkali compound (A) by means of an extrusion equipment, oligomers, moisture, decomposition products of the alkali compound (A) and the like are likely to be generated, and therefore at least one vacuum ventilation mechanism is preferably installed in a barrel site of the kneading equipment. Installation of the vacuum ventilation mechanism makes it possible to prevent deterioration of the master batch with the passage of time, prevent troubles such as inferior bite in the step (c), foaming and the like and enhance the physical properties of the molded article. Further, a filter is preferably provided in a dice site of the extrusion equipment in order to remove foreign matters mixed in, and an aperture of the filter is preferably 160 μm or less, more preferably 100 μm or less.

In the step (b), a blend ratio of the raw material alkali compound (A) based on 100 parts by mass of the polyamide (X) is preferably 14 to 0.5 parts by mass, more preferably 10 to 1 parts by mass and further preferably 7 to 2 parts by mass based on 100 parts by mass of the polyamide (X) from the viewpoints of inhibiting a reduction in the viscosity and inhibiting formation of gels and coloring.

In the step (b), moisture contained in the polyamide (X) makes it possible to enhance a solubility of the alkali compound (A) in the master batch to evenly disperse them. In particular, a moisture content contained in the polyamide (X) is preferably 0.1 to 0.8% by mass. When the moisture content is less than 0.1% by mass, the alkali compound (A) is insufficiently molten and dispersed in the polyamide (X), and a rise in the resin pressure in the molding and generation of irregularities in the molded article are likely to be brought about. When the moisture content is larger than 0.8% by mass, a large amount of steam is generated in the step (b) to turn the alkali compound (A) in the input port into a sherbet form by the steam in a certain case, and a supplying amount of the alkali compound (A) is likely to become instable.

<Step (c)>

The step (c) is a step in which the master batch obtained in the step (b) described above is added to the polyamide (X) obtained in the step (a) to obtain the polyamide resin composition.

A molded article obtained by subjecting the polyamide (X) as it is to mold processing is excellent in properties and an appearance immediately after starting molding, but gelatinous substances mixed in are increased as the mold processing work is carried out over a long time to make the quality of the product instable in a certain case. Particularly in a case of a film and the like, breaking is brought about due to gels, and the equipment can not help being stopped, so that the production efficiency is deteriorated. This is estimated to be caused due to that the polyamide continues staying locally in a space of a melt kneading part through a dice, whereby it is excessively heated and turned into gels and that the gels formed flow out. In contrast with this, the master batch containing the alkali compound (A) is added to the polyamide (X) in the present invention in order to prevent gelation generated in the mold processing.

The present inventors have found from measurement of a molecular weight by gel chromatography that when polyamide is continuously heated under applied pressure and low oxygen in a molten state, the polyamide is advanced in polarization into a low molecular weight part and a high molecular weight part and that among them, the more the high molecular weight component is increased, the more the production amount of gels is increased. Further, they have found that the high molecular weight component is decreased by adding the alkali compound (A) to the polyamide. The reason therefor is estimated to be attributable to that progress of amidation brought about particularly during molding of the polyamide resin composition is retarded by addition of the alkali compound (A) and that it inhibits resultingly an increase in the molecular weight component and the gelation.

In the step (c), a blend ratio (the master batch/the polyamide (X))) of the master batch to the polyamide (X) is preferably 0.5 to 20 parts by mass/99.5 to 80 parts by mass, more preferably 0.7 to 12 parts by mass/99.3 to 88 parts by mass and further preferably 1 to 6 parts by mass/99 to 94 parts by mass from the viewpoints of the stable moldability, the molded article having a good appearance and inhibiting formation of gels. A blend ratio of the master batch/the polyamide (X) described above means a blend ratio based on total 100 parts by mass of the master batch and the polyamide (X). If a blend ratio of the master batch/the polyamide (X) exceeds 20 parts by mass/80 parts by mass, a mixing proportion of the polyamide originating in the master batch having a heat history is increased, whereby the product is likely to be yellowed or molding is likely to be difficult due to a reduction in the viscosity. Further, if a large amount of moisture is contained in the master batch, the molded article is likely to be whitened due to acceleration of the crystallization speed to damage an appearance thereof in a certain case or the secondary processability such as stretching and the like is likely to be damaged. On the other hand, if a blend ratio of the master batch/the polyamide (X) is 0.5 part by mass/99.5 parts by mass or more, gels can be inhibited from being formed in the mold processing.

A mole concentration P of a phosphorus atom contained per g of the polyamide resin composition of the present invention is 0.03 μmol/g or more and less than 0.32 μmol/g, preferably 0.06 to 0.26 μmol/g and more preferably 0.1 to 0.2 μmol/g from the viewpoints of enhancing the processing stability in the melt processing and preventing the polyamide from being colored. If P is less than 0.03 μmol/g, the polyamide is liable to be colored during the polymerization, and gels tend to be formed. Also, if P is too high, the polyamide is observed to be improved in coloring, but gelation reaction of the polyamide is accelerated, and the resin pressure is elevated in the mold processing in a certain case by clogging of a filter which is considered to be attributable to a thermally modified product of the phosphorus atom-containing compound (B).

A sum (hereinafter referred to as "a total mole concentration of an alkali metal atom and an alkaline earth metal atom") M of values obtained by multiplying a mole concentration of an alkali metal atom and a mole concentration of an alkaline earth metal atom each contained per g of the polyamide resin composition of the present invention by valencies thereof respectively is 2.2 to 26.1 μmol/g, preferably 4.3 to 19.5 μmol/g and more preferably 6.5 to 13.0 μmol/g from the viewpoint of preventing gelation caused in the mold processing. Controlling M to 2.2 μmol/g or more is estimated to retard an increase in a molecular weight of the polyamide by heat to make it possible to inhibit gels from being formed. On the other hand, if M exceeds 26.1 μmol/g, the inferior molding is brought about in a certain case by a reduction in the viscosity. In addition thereto, coloring and whitening are brought about in some cases, and the non-molten alkali compound (A) is deposited in a certain case.

As described above, the alkali metal salt is used as the phosphorus atom-containing compound (B) in a certain case. Further, as described later, in the production of the polyamide resin composition of the present invention, the alkali metal compound (C) is added, if necessary, in the polycondensation of the polyamide, and the master batch is added after the polycondensation of the polyamide. Accordingly, M is a sum of values obtained by multiplying the mole concentrations of all of an alkali metal atom and an alkaline earth metal atom each contained per g of the polyamide resin composition by valencies thereof respectively.

In the present invention, a value (M/P) obtained by dividing a total mole concentration M of an alkali metal atom and an alkaline earth metal atom each contained per g of the polyamide resin composition of the present invention by a mole concentration P of a phosphorus atom contained per g of the polyamide resin composition of the present invention is exceeding 5 and 200 or less, preferably 20 to 150 and more preferably 35 to 100 from the viewpoints of preventing gelation brought about in the mold processing, enhancing the processing stability in the melt molding and preventing the polyamide from being colored. If M/P is 5 or less, an effect of inhibiting the amidation reaction by adding the master batch is short in a certain case, and gels in the polyamide is increased in some cases. On the other hand, if M/P exceeds 200, the inferior molding is caused in a certain case by a reduction in the viscosity. In addition thereto, coloring and whitening are brought about in some cases, and the non-molten alkali compound (A) is deposited in a certain case.

As described above, the same compound as the alkali metal compound (C) which can be added in producing the polyamide (X) is also shown as the example of the alkali compound (A) contained in the master batch obtained in the step (b). However, if the alkali metal compound (C) is added too much in the melt polymerization, an amidation reaction accelerating effect of the phosphorus atom-containing compound (B) is inhibited too much to retard the polycondensation, and a heat history in producing the polyamide grows large to increase gels of the polyamide in a certain case. Accordingly, a role of preventing gels from being formed in the mold processing can not be played by increasing an amount of the alkali metal compound (C) added in forming the polyamide (X) from the monomers by melt polymerization. In contrast with this, the master batch containing the polyamide (X) and the alkali compound (A) is added to the polyamide (X) in the step (c) in the present invention to thereby make it possible to prevent effectively gels from being formed in the mold processing.

In the polyamide resin composition of the present invention which is produced by the process described above, gels can be inhibited from being formed in the melt polymerization for the polyamide, and gels can be inhibited as well from being formed in the mold processing of the resin composition obtained to make it possible to carry out the production stably for long time.

In the present invention, an effect of inhibiting gels of the polyamide resin composition from being formed is evaluated by comparing a gel ratio of the polyamide heated at a fixed temperature for a fixed time in a molten state at a high pressure under the estimation of a state to which the polyamide is exposed in molding. When the resin heated under applying pressure is dipped in hexafluoroisopropanol (HFIP) for 24 hours, the resin which is not gelatinized is completely dissolved therein, but the resin which is gelatinized remains in the form of an insoluble component of a swollen state. The gel ratio is calculated from the above insoluble component. The gel ratio referred to in the present invention means a value determined in terms of a percentage by dividing a weight of a residue obtained by filtrating the above insoluble component under vacuum by a membrane filter and then drying it by a denominator which is a weight of the resin weighed in advance before dipping in HFIP.

A gel ratio of the polyamide resin composition of the present invention is smaller than a gel ratio of a polyamide resin composition produced without adding the master batch after polymerizing the polyamide. This shows that gels are inhibited from being formed in the mold processing of the polyamide resin composition of the present invention. A gel ratio of the polyamide resin composition of the present invention observed when it is allowed to stay for a prescribed time at 270 to 290° C. which is a resin temperature of the polyamide resin in the mold processing is preferably 50% or less, more preferably 33% or less and further preferably 20% or less of a gel ratio observed when a polyamide resin composition produced without adding the alkali compound (A) is allowed to stay on the same conditions. The staying time can be set to, for example, 24, 36 or 72 hours.

An index showing that the polyamide resin composition of the present invention has a good appearance and good physical properties can be evaluated by an average production amount of fish eyes counted by observing a film prepared from the polyamide resin composition under a fish eye inspection equipment. A cause of generating fish eyes in the polyamide resin composition is considered to be attributable to, for example, flowing of gels generated in the molding machine and precipitation of insoluble matters of the alkali compound (A). In the present invention, a count number of foreign matters having a circle-corresponding diameter of 20 μm or more is preferably 900 pieces or less, more preferably 700 pieces or less and further preferably 600 pieces or less per $m^2$ of the polyamide film having a thickness of 50 μm. If it exceeds 900 pieces, irregularities are visually confirmed to be present on the film surface, and the appearance is damaged. In addition thereto, breaking is likely to be brought about in subjecting the molded article further to stretch processing, and therefore it is not preferred.

The polyamide resin composition of the present invention can be blended with one or a plurality of other resins such as nylon 6, nylon 66, nylon 66,6, polyesters, polyolefins, phenoxy resins and the like as long as the object is not damaged. Further, capable of being added are inorganic fillers such as glass fibers, carbon fibers and the like; tabular inorganic fillers such as glass flakes, talc, kaolin, mica, montmorillonite, organic clays and the like; impact resistant modifying materials such as various elastomers and the like; crystal nucleus agents; lubricants such as fatty acid amide base lubricants, fatty acid amide base compounds and the like; antioxidants such as copper compounds, organic or inorganic halogen base compounds, hindered phenol base antioxidants, hindered amine base antioxidants, hydrazine base antioxidants, sulfur base compounds, phosphorus base compounds and the like; coloring inhibitors; UV absorbers such as benzotriazole base UV absorbers and the like; additives such as mold releasing agents, plasticizers, coloring agents, flame retardants and the like; and additives such as compounds containing cobalt metal, benzoquinones, anthraquinones and naphthoquinones which are compounds providing an oxygen scavenging ability.

The polyamide resin composition of the present invention is excellent in a gas barriering property and a transparency and has a stable melt characteristic. The polyamide resin composition of the present invention can be processed into various shapes such as sheets, films, injection-molded bottles, blow bottles, injection-molded cups and the like by making use of the above polyamide resin composition for at least a part thereof to prepare molded articles. It can be used preferably for packaging materials, packaging vessels and fiber materials.

A production method of the molded articles shall not specifically be restricted, and they can be produced by optional methods. They can be produced by, for example, extrusion molding and injection molding. Also, the molded articles obtained by extrusion molding and injection molding may be further subjected to mold processing by uniaxial stretching, biaxial stretching, stretching blow and the like.

To be specific, they can be processed into films and sheets by an extrusion method in which a T die is equipped, an inflation film method and the like, and the raw material films obtained are further subjected to stretching processing, whereby stretched films and heat shrinkable films can be obtained. Further, injection-molded cups can be prepared by an injection molding method, and blown bottles can be prepared by a blow molding method. A pre-form is produced by injection molding, and then a bottle can be prepared from it by blow molding.

Also, they can be processed as well into films and sheets having a multilayer structure with other resins, for example, polyethylene, polypropylene, nylon 6 and PET, metal foils, papers and the like by methods such as extrusion laminate, coextrusion and the like. The processed films and sheets can be used for wraps, pouches of various shapes, cap materials for vessels, packaging vessels such as bottles, cups, trays, tubes and the like. Further, they can be processed as well into pre-forms and bottles having a multilayer structure with PET and the like by a multilayer injection molding method and the like.

Packaging vessels obtained by making use of the polyamide resin composition of the present invention are excellent in a gas barriering property and a transparency. The above packing vessels can be charged with various products including, for example, liquid beverages such as carbonated beverages, juices, water, milk, Japanese sake, whisky, distilled spirits, coffee, tea, jelly beverages, health beverages and the like, seasonings such as seasoning liquids, sauces, soy sauces, dressings, liquid stocks, mayonnaises, fermented soybean pastes, grated spices and the like, paste foods such as jams, creams, chocolate pastes and the like, liquid foods represented by liquid processed foods such as liquid soups, cooked foods, pickles, stews and the like, crude noodles and boiled noodles such as buckwheat noodles, noodles, Chinese noodles and the like, rice before cooking such as milled rice, humidity-conditioned rice, non-washing rice and the like, cooked rice, high moisture foods represented by processed rice products such as boiled rice mixed with fishes and vegetables, festive red rice, rice gruel and the like; low moisture foods represented by powder seasonings such as powder soups, instant bouillons and the like, dried vegetables, coffee beans, coffee powder, tea, cakes prepared by using cereals as raw materials; solid and liquid chemicals such as agricultural chemicals, insecticides and the like, liquid and paste drugs and medicines, skin lotions, skin creams, skin emulsions, hair dressings, hair dyes, shampoos, soaps, detergents and the like.

The polyamide resin composition of the present invention can also be used as materials for gasoline tanks and hoses of cars, bikes and the like as a gasoline barriering material. The polyamide resin composition of the present invention can also be used as a fiber material for monofilaments and the like.

EXAMPLES

The present invention shall be explained below in further details with reference to examples, but the present invention shall not be restricted to them.

Production Example 1

Preparation of the Raw Material Alkali Compound (A)

Commercially available sodium acetate was used as it was for the raw material alkali compound (A), or the raw material alkali compound (A) was obtained by subjecting commercially available sodium acetate to crushing treatment by the following methods.

Crushing Method Example 1

Sodium acetate (anhydrous) (average particle diameter: 277 μm, a content of particles having a particle diameter of 300 μm or more: 45%, manufactured by Daito Chemical Co., Ltd.) was crushed on the conditions of a crushing revolution of 5400 rpm and a screen mesh diameter of 0.5 mm by means of a free crushing equipment M-4 manufactured by Nara Machinery Co., Ltd. to obtain crushed sodium acetate in which an average particle diameter was 117 μm and in which a content of particles having a particle diameter of 300 μm or more was less than 1%.

Crushing Method Example 2

Sodium acetate (anhydrous) (average particle diameter: 316 μm, a content of particles having a particle diameter of 300 μm or more: 70%, manufactured by Daito Chemical Co., Ltd.) was crushed on the conditions of a crushing revolution of 11000 rpm and a screen mesh diameter of 0.7 mm by means of a sample mill SAM-T manufactured by Nara Machinery Co., Ltd. to obtain crushed sodium acetate in which an average particle diameter was 144 μm and in which a content of particles having a particle diameter of 300 μm or more was 4%.

Crushing Method Example 3

Sodium acetate was crushed on the same conditions to obtain crushed sodium acetate in which an average particle diameter was 175 μm and in which a content of particles having a particle diameter of 300 μm or more was 3%, except that in Crushing method example 2, the screen mesh diameter was changed to 1.5 mm.

Crushing Method Example 4

Sodium acetate (anhydrous) (average particle diameter: 325 μm, a content of particles having a particle diameter of 300 μm or more: 50%, manufactured by Yoneyama Chemical Industry Co., Ltd.) was crushed on the conditions of a classifying revolution of 3880 rpm, a crushing revolution of 6800 rpm and an air amount of 10 $m^3$/minute by means of Pulverizer ACM-10 manufactured by Hosokawa Micron Corporation to obtain crushed sodium acetate in which an average particle diameter was 7 μm and in which a content of particles having a particle diameter of 300 μm or more was less than 1%.

An average particle diameter of the raw material alkali compound (A) obtained was calculated by dispersing the raw material alkali compound (A) in chloroform and then measuring a volume distribution thereof by means of a laser diffraction scattering method particle size measuring equipment (LA-910 manufactured by HORIBA, Ltd.) to set it to an arithmetic average diameter. Further, a volume proportion of particles having a particle diameter of 300 μm or more was measured in terms of a percentage. Or, when an average particle diameter of the raw material alkali compound (A) was 100 μm or less, a volume distribution thereof was measured without dispersing it in a solvent by means of a laser diffraction scattering method particle size measuring equipment (MASTERSIZER 2000, manufactured by Malvern Instruments Ltd.), and it was set to an arithmetic average diameter to calculate an average particle diameter thereof. Further, a volume proportion of particles having a particle diameter of 300 μm or more was measured in terms of a percentage. The results thereof are shown in Table 2.

Production Example 2

Melt Polymerization of Polyamide

A reaction vessel having a content volume of 50 liter equipped with a stirrer, a partial condenser, a full condenser, a thermometer, a dropping funnel, a nitrogen introducing tube and a strand die was charged with 15000 g (102.6 mole) of adipic acid precisely weighed, 432.5 mg (4.083 mmol, 5 ppm in terms of a phosphorus atom concentration in the polyamide) of sodium hypophosphite monohydrate ($NaH_2PO_2 \cdot H_2O$) and 207.7 mg (2.53 mmol, 0.62 in terms of a mole number ratio based on sodium hypophosphite monohydrate) of sodium acetate and sufficiently substituted with nitrogen, and then the vessel was heated up to 170° C. while stirring an inside of the system under a small amount of nitrogen flow. Metaxylylenediamine 13895 g (102.0 mol) was dropwise added thereto while stirring, and an inside of the system was continuously heated while removing condensation water produced to an outside of the system. After finishing dropwise adding metaxylylenediamine, the internal temperature was controlled to 260° C. to continue the reaction for 40 minutes. Then, an inside of the system was pressurized by nitrogen to take out the polymer from the strand die, and this was pelletized to obtain about 24 kg of polyamide (X1a).

Production Example 3

Drying of Polyamide

The polyamide (X1a) obtained in Production Example 2 was dried in a state of 0.1 Torr (13.33 Pa) or less and 40° C. for 2 hours by means of a vacuum dryer to obtain polyamide (X1b). The results thereof are shown in Table 1.

Production Example 4

Humidity Conditioning of Polyamide

The polyamide (X1a) obtained in Production Example 2 was maintained in a state of 40° C. and 90% RH for 24 hours to obtain polyamide (X1c). The results thereof are shown in Table 1.

Production Example 5

Solid Phase Polymerization of Polyamide

A jacket-equipped tumble dryer in which a nitrogen gas introducing tube, a vacuum line, a vacuum pump and a thermocouple for measuring an inner temperature were provided was charged with the polyamide (X1a) obtained in Production Example 2, and an inside of the tumble dryer was sufficiently substituted with nitrogen having a purity of 99% by volume or more while rotating it at a fixed speed. Then, the tumble dryer was heated under nitrogen gas flow, and the pellet temperature was elevated up to 150° C. in about 150 minutes. When the pellet temperature reached 150° C., a pressure in the system was reduced to 1 torr (133.3 Pa) or less. The temperature was further continued to be elevated, and after the pellet temperature was elevated up to 200° C. in about 70 minutes, the system was maintained at 200° C. for 30 to 45 minutes. Then, a nitrogen gas having a purity of 99% by volume or more was introduced into the system, and the tumble dryer was cooled while rotating to obtain polyamide (X1d). The properties of the polyamide (X1d) obtained are shown in Table 1.

Production Example 6

Melt Polymerization of Polyamide

About 24 kg of polyamide was obtained by the same method as in Production Example 2, except that an addition amount of sodium hypophosphite monohydrate was changed to 173.1 mg (1.633 mmol, 2 ppm in terms of a phosphorus atom concentration in the polyamide) and that an addition amount of sodium acetate was changed to 82.6 mg (1.007 mmol, 0.62 in terms of a mole number ratio based on sodium hypophosphite monohydrate).
(Solid Phase Polymerization of Polyamide)

Subsequently, solid phase polymerization of the polyamide was carried out by the same method as in Production Example 5 to obtain polyamide (X2d), except that the polyamide obtained in the melt polymerization described above was used. The properties of the polyamide (X2d) obtained are shown in Table 1.

Production Example 7

Melt Polymerization of Polyamide

About 24 kg of polyamide was obtained by the same method as in Production Example 2, except that an addition amount of sodium hypophosphite monohydrate was changed to 86.5 mg (0.816 mmol, 1 ppm in terms of a phosphorus atom concentration in the polyamide) and that an addition amount of sodium acetate was changed to 41.3 mg (0.503 mmol, 0.62 in terms of a mole number ratio based on sodium hypophosphite monohydrate).
(Solid Phase Polymerization of Polyamide)

Subsequently, solid phase polymerization of the polyamide was carried out by the same method as in Production Example 5 to obtain polyamide (X3d), except that the polyamide obtained in the melt polymerization described above was used. The properties of the polyamide (X3d) obtained are shown in Table 1.

Production Example 8

Melt Polymerization of Polyamide

About 24 kg of polyamide was obtained by the same method as in Production Example 2, except that an addition amount of sodium hypophosphite monohydrate was changed to 778.7 mg (7.343 mmol, 9.5 ppm in terms of a phosphorus atom concentration in the polyamide) and that an addition amount of sodium acetate was changed to 371.6 mg (4.53 mmol, 0.62 in terms of a mole number ratio based on sodium hypophosphite monohydrate).

(Solid Phase Polymerization of Polyamide)

Subsequently, solid phase polymerization of the polyamide was carried out by the same method as in Production Example 5 to obtain polyamide (X4d), except that the polyamide obtained in the melt polymerization described above was used. The properties of the polyamide (X4d) obtained are shown in Table 1.

<Phosphorus Atom Mole Concentration $p_0$ of Polyamide and Total Mole Concentration $m_0$ of an Alkali Metal Atom and an Alkaline Earth Metal Atom>

A total mole concentration $m_0$ of an alkali metal atom and an alkaline earth metal atom and a mole concentration $p_0$ of a phosphorus atom each contained per g of the polyamide which was the raw material of the master batch were quantitatively determined by means of an atomic absorption spectrometer (trade name: AA-6650, manufactured by Shimadzu Corporation) and an ICP emission spectrometer (trade name: ICPE-9000, manufactured by Shimadzu Corporation) after the polyamide resin was subjected to decomposition treatment in nitric acid by a microwave. The measured values were obtained in terms of a weight ratio (ppm), and therefore $p_0$ and $m_0$ were calculated by using the atomic masses and the valencies. The results thereof are shown in Table 1.

<Moisture Percentage of Polyamide>

The moisture percentages of the polyamides (X1a) to (X1c) in heating at 235° C. for 30 minutes under nitrogen flow were measured by means of a Karl Fisher type moisture measuring equipment (model: AQ-2000, manufactured by Hiranuma Sangyo Corporation). The results thereof are shown in Table 1.

Examples 1 to 11 and Comparative Examples 1 to 3
(Production of master batches)

A double shaft extruding equipment (model: TEM37BS, bore diameter: 37 mmϕ, manufactured by Toshiba Machine Co., Ltd.) equipped with a strand die in which a filter of 100 mesh was installed was used to supply sodium acetate and any of the polyamides (X1a) to (X1c) described above respectively from different feeders in blend proportions shown in Table 2 to turn the mixture into a strand form. Next, it was cooled in a water-cooled bath and then pelletized by means of a pelletizer. Thereafter, the pellets were dried in a state of 0.1 Torr or less and 140° C. for 8 hours by means of a vacuum dryer to obtain master batches 1 to 11.

An average particle diameter of the alkali compound (A) contained in the master batch obtained and a contained number of particles having a particle diameter of exceeding 80 μm in 5 square millimeter of a cross section of the master batch are shown in Table 2.

<Mole Concentration p of a Phosphorus Atom and Total Mole Concentration m of an Alkali Metal Atom and an Alkaline Earth Metal Atom Each Contained Per g of the Master Batch>

A mole concentration p of a phosphorus atom and a total mole concentration m of an alkali metal atom and an alkaline earth metal atom each contained per g of the master batch were quantitatively determined by means of the atomic absorption spectrometer (trade name: AA-6650, manufactured by Shimadzu Corporation) and the ICP emission spectrometer (trade name: ICPE-9000, manufactured by Shimadzu Corporation) after the master batch was subjected to decomposition treatment in nitric acid by a microwave. The measured values were obtained in terms of a weight ratio (ppm), and therefore p and m were calculated by using the atomic masses and the valencies. The results thereof are shown in Table 2.

<Total Mole Concentration M of an Alkali Metal Atom and an Alkaline Earth Metal Atom and a Mole Concentration P of a Phosphorus Atom Each Contained Per g of the Polyamide Resin Composition>

A total mole concentration M of an alkali metal atom and an alkaline earth metal atom and a mole concentration P of a phosphorus atom each contained per g of the polyamide resin composition were calculated by the same method as in p and m each contained per g of the master batch which were calculated above. The results thereof are shown in Table 3.

<Observation Of the Alkali Compound (A) in the Master Batch>

The master batch was buried in the resin, and a cross section thereof was exposed by means of a diamond cutter. Then, it was fixed on a carbon tape stuck on a sample table, and platinum/palladium was deposited thereon under vacuum atmosphere. Subsequently, a space diagram was prepared from the master batch on which platinum/palladium was deposited by using reflection electronic image observation, and it was photographed at 150 magnifications by means of a scanning electronic microscope (SEM). After a range in which 1000 particles or more of the alkali compound (A) were contained in the same plain surface was selected and subjected to binarization treatment, a region of 5 square millimeter in the above range was further selected to calculate an average particle diameter of the respective particle images present in the above region in terms of an area proportion, and a value thereof was calculated as an average particle diameter of the alkali compound (A) contained in the master batch.

Further, the number of the particle images having a major diameter of exceeding 80 μm in a region of 5 square millimeter in which the average particle diameter described above was calculated was counted, and the same measurement as described above was carried out five times by every pellet to set an average value thereof per one measurement to "a contained number of the particles having a particle diameter of exceeding 80 μm in a region of 5 square millimeter". The results thereof are shown in Table 2.

Examples 1 to 11 and Comparative Examples 1 to 3

Production of Films from Polyamide Resin Compositions

The master batches 1 to 9 and 11 obtained were used and mixed with the polyamides (X1d) to (X4d) in blend amounts shown in Table 3 based on 100 parts by mass of the polyamides (X1d) to (X4d), and then films were produced by means of a film extrusion equipment comprising a 25 mmϕ single shaft extrusion equipment (model: PTM25, manufactured by Plastics Technology Co., Ltd.), a head provided with a filter of 600 mesh and a T die and a receiving equipment equipped with a cooling roll, a fish eye inspection equipment (model: GX70W, manufactured by Mamiya-OP Co., Ltd.), a reeling device and the like. The polyamide resin composition was extruded in a film form from the extrusion equipment while maintaining a discharge rate of 3 kg/hour, and the receiving velocity was adjusted to obtain a film having a width of 15 cm and a thickness of 50 μm.

Evaluation of Film:

The films were evaluated by the following methods. The results thereof are shown in Table 4.

<Fish Eye Number>

The films described above were allowed to pass between a camera and a light source of a fish eye inspection equipment and reeled on a reeling equipment, and a fish eye number (circle-corresponding diameter: 20 μm or more) of the film having a width of 10 cm and a length of 50 m was counted when one hour passed since starting extrusion to calculate the fish eye number per m$^2$. The smaller fish eye number is more preferred.

<Resin Pressure of Extrusion Equipment Head>

After finishing counting of the fish eye number, the reeling velocity was adjusted to prepare a film having a width of 15 cm and a thickness of 250 μm. Then, the extrusion was continued to measure the resin pressures of the extrusion equipment head immediately after starting the extrusion, after 3 hours passed and after 6 hours passed respectively, and the presence of a change thereof was measured. A smaller change amount of the resin pressures of the extrusion equipment head is preferred.

<Appearance of the Film>

The appearances of the films obtained were visually observed. It is preferred that coloring of the films and foreign matters such as gels and the like are not observed.

<Relative Viscosity of the Polyamide Resin Composition>

A film 1 g of the polyamide resin composition was precisely weighed and dissolved in 100 ml of 96 mass % sulfuric acid at 20 to 30° C. by stirring. After completely dissolved, 5 ml of the solution was immediately put in a Cannon-Fenske viscometer and left standing in a thermostatic bath of 25° C. for 10 minutes, and then a falling time (t) thereof was measured. Further, a falling time ($t_0$) of 96 mass % sulfuric acid itself was measured as well in the same manner. The relative viscosity was calculated from t and $t_0$ according to the following equation:

relative viscosity=$t/t_0$

<Gel Ratio>

Preparation of Staying Sample:

The film having a thickness of 250 μm described above was cut in a form of a circle having a diameter of 30 mm, and four sheets thereof were prepared. The above circular films were concentrically superposed and inserted into a hole part of a 100×100 mm polytetrafluoroethylene sheet of 1 mm thickness having a hole bored in a diameter of 30 mm, and further, the above sheet was interposed between two 100×100 mm polytetrafluoroethylene sheets having a thickness of 1 mm.

Next, the foregoing polytetrafluoroethylene sheets which interposed the film described above therebetween were disposed in a center of the groove in a 150×150 mm metal plate of 15 mm thickness having a 120×120 mm groove of 3 mm depth in a central part, and further, it was covered thereon with a 150×150 mm metal plate of 15 mm thickness. Then, the metal plates were fixed by a bolt.

Subsequently, the metal plates were heated on the respective conditions of 72 hours at 270° C., 24 hours at 290° C. or 36 hours at 290° C. in a state in which the above metal plates were interposed at 50 kg/cm$^2$ or more by a hot press equipment heated in advance. After each time passed, the above metal plates were taken out and quenched, and after they were sufficiently cooled down to room temperature, the staying samples were taken out.

Calculation of Gel Ratio:

Next, the staying sample described above was dried at 60° C. for 30 minutes in a constant temperature dryer, and then 100 mg of the dried sample was immediately weighed. The weighed staying sample was dipped in 10 ml of hexafluoroisopropanol (HFIP) having a purity of 99% for 24 hours, and then it was filtrated under vacuum through a polytetrafluoroethylene-made membrane filter having a pore diameter of 300 μm which was weighed in advance. A residue remaining on the membrane filter was washed three times by 2 ml of HFIP, and then the filter having the residue attached thereon was dried at 60° C. for 30 minutes in a constant temperature dryer.

A total weight of the residue and the filter which were dried was weighed, and an amount (gel amount) of an HFIP-insoluble component in the staying sample was calculated from a difference thereof from a weight of the membrane filter which was weighed in advance. The gel ratio was determined in terms of % by mass of the HFIP-insoluble component based on the staying sample before dipped in HFIP.

The same operation was carried out three times from preparation of the staying sample on the same conditions, and the average values of the gel ratios in the respective conditions were determined.

Comparative Example 4

Production of a Film of the Polyamide Resin Composition

Sodium acetate having an average particle diameter of 80 μm was dry-blended, in place of the master batch used in Example 1, as the raw material alkali compound directly with the polyamide so that it accounted for 0.1% based on 100 parts by mass of the polyamide, and then a film was produced on the same conditions as in Example 1 by means of the same equipment as in Example 1.

Evaluation of the film, a resin pressure of the extruding equipment head, an appearance of the film and the measuring result of the gel ratio are shown in Table 4.

Comparative Example 5

Production of a Film of the Polyamide Resin Composition

Only the polyamide (X1d) was used without adding the master batch used in Example 1 to produce a film on the same conditions as in Example 1 by means of the same equipment as in Example 1.

Evaluation of the film, a resin pressure of the extruding equipment head, an appearance of the film and the measuring result of the gel ratio are shown in Table 4.

Comparative Examples 6 and 7

Production of Films of the Polyamide Resin Composition

Calcium stearate was dry-blended, in place of the master batch used in Example 1, as the raw material alkali compound directly with the polyamide in blend amounts shown in Table 3 based on 100 parts by mass of the polyamide, and then films were produced on the same conditions as in Example 1 by means of the same equipment as in Example 1.

Evaluation of the films, a resin pressure of the extruding equipment head, an appearance of the films and the measuring results of the gel ratios are shown in Table 4.

TABLE 1

| Kind of polyamide (X) | Moisture ratio (%) | $p_0$[1] ($\mu$mol/g) | $m_0$[2] ($\mu$mol/g) |
|---|---|---|---|
| X1a | 0.6 | 0.16 | 0.26 |
| X1b | 0.1 | 0.16 | 0.26 |
| X1c | 2.0 | 0.16 | 0.26 |
| X1d | — | 0.16 | 0.26 |
| X2d | — | 0.06 | 0.11 |
| X3d | — | 0.03 | 0.056 |
| X4d | — | 0.31 | 0.49 |

[1] Phosphorus atom concentration in the polyamide 1 g
[2] Total mole concentration of an alkali metal atom and an alkaline earth metal atom in the polyamide 1 g

TABLE 2

| | Raw material alkali compound (A) | | | | Alkali compound (A) in master batch | | | |
|---|---|---|---|---|---|---|---|---|
| | kind | Average particle diameter[1] ($\mu$m) | Ratio in which particles having a particle diameter of 300 $\mu$m or more are contained (%) | Polyamide (X) which is raw material | Blend amount Raw material alkali compound (A)/ polyamide (X) (mass %) | Average particle diameter[2] of alkali compound (A) | Contained number[3] of particles having a particle diameter of exceeding 80 $\mu$m | $m$[4] ($\mu$mol/g) | $p$[5] ($\mu$mol/g) |
| Master batch 1 | Na acetate | 117 | <1 | X1a | 0.4 | 17 | 0.0 | 48 | 0.16 |
| Master batch 2 | Na acetate | 117 | <1 | X1a | 0.8 | 17 | 0.0 | 97 | 0.16 |
| Master batch 3 | Na acetate | 117 | <1 | X1a | 1.5 | 18 | 0.0 | 185 | 0.16 |
| Master batch 4 | Na acetate | 117 | <1 | X1a | 4.0 | 19 | 0.0 | 488 | 0.16 |
| Master batch 5 | Na acetate | 117 | <1 | X1a | 12.0 | 35 | 0.2 | 1434 | 0.16 |
| Master batch 6 | Na acetate | 144 | 4 | X1a | 4.0 | 45 | 0.4 | 483 | 0.16 |
| Master batch 7 | Na acetate | 117 | <1 | X1b | 4.0 | 33 | 0.2 | 478 | 0.16 |
| Master batch 8 | Na acetate | 148 | 7 | X1a | 4.0 | 70 | 2.2 | 478 | 0.16 |
| Master batch 9 | Na acetate | 175 | 3 | X1a | 4.0 | 65 | 1.6 | 478 | 0.16 |
| Master batch 10[6] | Na acetate | 117 | <1 | X1a | 15.0 | Incapable of molding master batch | | 1774[7] | 0.16 |
| Master batch 11 | Na acetate | 7 | <1 | X1a | 4.0 | 4 | 0.0 | 488 | 0.16 |

[1] Measured based on a volume by a laser diffraction scattering method and determined in terms of an arithmetically calculated diameter.
[2] Range in which 1000 particles or more of the alkali compound (A) were contained was selected by means of SEM and subjected to binarization treatment, and then calculated was an average particle diameter of the respective particle images present in a region of 5 square millimeter in the above range in terms of an area proportion.
[3] Average value per one measurement obtained by counting the number of the particle images having a maximum diameter of exceeding 80 $\mu$m which were present in a cross section of 5 square millimeter of the master batch and carrying out five times the same measurement by every pellet.
[4] Total mole concentration m of an alkali metal atom and an alkaline earth metal atom each contained per g of the master batch.
[5] Concentration of a phosphorus atom contained per g of the master batch.
[6] The viscosity was low, and pellets could not be molded.
[7] Measured by using a resin lump discharged from the extruding equipment.

TABLE 3

| | Master batch/polyamide blended | | | Polyamide resin composition | | |
|---|---|---|---|---|---|---|
| | Master batch added | Polyamide (X) | Master batch/ polyamide (X) (mass %) | $p$[1] ($\mu$mol/g) | $M$[2] ($\mu$mol/g) | M/P |
| Example 1 | Master batch 2 | X1d | 12.50% | 0.16 | 12.2 | 76.4 |
| Example 2 | Master batch 3 | X3d | 1.33% | 0.03 | 2.6 | 74.0 |
| Example 3 | Master batch 3 | X2d | 1.33% | 0.07 | 2.6 | 39.0 |
| Example 4 | Master batch 3 | X1d | 1.33% | 0.16 | 2.6 | 16.9 |
| Example 5 | Master batch 3 | X4d | 1.33% | 0.30 | 2.9 | 9.7 |
| Example 6 | Master batch 4 | X2d | 2.50% | 0.07 | 12.3 | 183.6 |
| Example 7 | Master batch 4 | X1d | 2.50% | 0.16 | 12.2 | 77.1 |
| Example 8 | Master batch 5 | X1d | 0.83% | 0.16 | 12.0 | 75.6 |
| Example 9 | Master batch 6 | X1d | 2.50% | 0.16 | 11.9 | 76.4 |

TABLE 3-continued

| | Master batch/polyamide blended | | | Polyamide resin composition | | |
|---|---|---|---|---|---|---|
| | Master batch added | Poly-amide (X) | Master batch/polyamide (X) (mass %) | P[1] (μmol/g) | M[2] (μmol/g) | M/P |
| Example 10 | Master batch 7 | X1d | 2.50% | 0.16 | 12.2 | 75.6 |
| Example 11 | Master batch 11 | X1d | 2.50% | 0.16 | 12.2 | 75.6 |
| Comparative Example 1 | Master batch 1 | X1d | 25.00% | 0.16 | 12.0 | 75.6 |
| Comparative Example 2 | Master batch 8 | X1d | 2.50% | 0.16 | 12.2 | 75.6 |
| Comparative Example 3 | Master batch 9 | X1d | 2.50% | 0.16 | 12.2 | 75.6 |
| Comparative Example 4 | AcNa[3] | X1d | 0.10% | 0.16 | 11.6 | 77.1 |
| Comparative Example 5 | — | X1d | — | 0.16 | 0.3 | 1.6 |
| Comparative Example 6 | Ca stearate[4] | X1d | 0.04% | 0.16 | 14.0 | 88.7 |
| Comparative Example 7 | Ca stearate[4] | X1d | 1.50% | 0.16 | 32.9 | 219.4 |

[1] P: mole concentration of a phosphorus atom contained per g of the polyamide resin composition.
[2] M: total mole concentration of an alkali metal atom and an alkaline earth metal atom contained per g of the polyamide resin composition.
[3] Sodium acetate having an average particle diameter of 80 μm was used as the raw material alkali compound.
[4] Calcium stearate was used as the raw material alkali compound.

TABLE 4

| | Resin pressure average value (MPa) | | | Fish eye number of film (eye/m$^2$) | Appearance of film | Relative viscosity of film (ηr) | Gel ratio (%) | | |
|---|---|---|---|---|---|---|---|---|---|
| | Immediately after starting | 3 hr | 6 hr | | | | 270° C. 72 hr stay | 290° C. 24 hr stay | 290° C. 36 hr stay |
| Example 1 | 1.6 | 1.5 | 1.5 | 330 | Good | 2.40 | 0.3 | 1.1 | 3.1 |
| Example 2 | 2.0 | 2.0 | 2.0 | 270 | Good | 2.60 | 14.8 | 15.6 | 21.2 |
| Example 3 | 2.1 | 2.1 | 2.1 | 300 | Good | 2.60 | 14.1 | 14.8 | 20.0 |
| Example 4 | 2.1 | 2.0 | 2.0 | 290 | Good | 2.60 | 13.3 | 14.3 | 18.9 |
| Example 5 | 2.0 | 2.0 | 2.1 | 390 | Good | 2.60 | 13.1 | 15.5 | 17.9 |
| Example 6 | 2.0 | 2.0 | 2.0 | 390 | Good | 2.55 | 1.9 | 1.2 | 5.0 |
| Example 7 | 2.0 | 2.0 | 2.0 | 330 | Good | 2.55 | 0.3 | 1.1 | 3.1 |
| Example 8 | 2.3 | 2.3 | 2.2 | 330 | Good | 2.62 | 1.2 | 4.5 | 2.2 |
| Example 9 | 2.0 | 2.3 | 2.7 | 650 | Good | 2.55 | 1.0 | 2.0 | 3.0 |
| Example 10 | 2.1 | 2.2 | 2.2 | 560 | Good | 2.58 | 0.5 | 1.1 | 2.5 |
| Example 11 | 2.1 | 2.1 | 2.1 | 280 | Good | 2.59 | 0.5 | 1.4 | 2.3 |
| Comparative Example 1 | 1.2 | 1.2 | 1.1 | 300 | Whitened • yellowed | 2.09 | 0.1 | 0.9 | 3.4 |
| Comparative Example 2 | 2.3 | 3.8 | 5.1 | 1210 | Irregularities | 2.54 | 0.3 | 1.1 | 3.1 |
| Comparative Example 3 | 2.3 | 3.6 | 4.5 | 1010 | Irregularities | 2.53 | 0.3 | 1.0 | 2.9 |
| Comparative Example 4 | 2.9 | 9.8 | 15.0 | 4670 | Irregularities | 2.45 | 0.3 | 1.9 | 3.4 |
| Comparative Example 5 | 2.3 | 2.3 | 2.4 | 290 | Good | 2.65 | 35.6 | 30.6 | 51.2 |
| Comparative Example 6 | 2.0 | 2.0 | 2.0 | 510 | Good | 2.40 | 29.9 | 24.5 | 44.5 |
| Comparative Example 7 | 1.5 | 1.5 | 1.5 | No measurable | Whitened | 2.29 | 1.1 | 1.9 | 4.7 | the gel ratio was high, and gels were formed when the excessive thermal history was applied by staying.

In contrast with this, in Examples 1 to 11 in which the master batch was added, a fish eye number of the films was small, and the gel ratio was low. Less gels were formed in the mold processing.

On the other hand, in Comparative Example 1 in which a total mole concentration of an alkali metal atom and an alkaline earth metal atom contained in the master batch was low, not only the film was yellowed, but also whitening was brought about to deteriorate notably the appearance. Further, in Comparative Example 2 in which a contained number of the particles of the alkali compound (A) having a particle diameter of 80 μm or more in the master batch was large and Comparative Example 3 in which an average particle diameter of the alkali compound (A) was large, it was confirmed that when carrying out mold processing by using the respective master batches, the resin pressure was elevated as time passed, and in addition thereto, it was confirmed as well that irregularities were formed on the film. Also, when sodium acetate having an average particle diameter of 80 μm was dry-blended as the raw material alkali compound directly with the polyamide without making use of the master batch in Comparative Example 4, irregularities were observed as well to be formed. When a small amount of calcium stearate was dry-blended as the raw material alkali compound directly with the polyamide without making use of the master batch in Comparative Example 6, a fish eye number of the film was small in the beginning, but the gel ratio was high, and gels were formed when an excessive thermal history was applied In Comparative Example 5 in which the master batch was not added, a fish eye number of the film was small at first, but by staying. When an addition amount of calcium stearate was increased more in Comparative Example 7 than in Comparative Example 6, whitening was generated on the film to deteriorate notably the appearance, and therefore a fish eye number of the film could not be measured.

Further, in molding the master batch 10, a melt viscosity of the resin was reduced since the raw material alkali compound (A) was excessively contained as compared with the polyamide (X), and pelletization thereof by a pelletizer was difficult, so that it was not suited to subsequent mold processing.

INDUSTRIAL APPLICABILITY

The polyamide resin composition prepared by making use of the master batch of the present invention is excellent in a gas barriering property and a transparency and has a good color tone. In addition thereto, it decreases a number of fish eyes in the film and reduces a gel ratio thereof, and less gels are formed in mold processing. Further, the resin pressure is inhibited from being elevated in subjecting the polyamide resin composition to mold processing to make it possible to enhance the productivity to a large extent. Accordingly, the polyamide resin composition prepared by making use of the master batch of the present invention is industrially useful as a packaging material, a gasoline barriering material, a fiber material, a packaging bottle and the like.

What is claimed is:

1. A master batch, comprising:
a polyamide (X) comprising a diamine unit containing 70 mole % or more of a metaxylylenediamine unit and a dicarboxylic acid unit; and
an alkali compound (A),
wherein:
an average particle diameter of the alkali compound (A) contained in the master batch is 50 μm or less;
a contained number of particles having a particle diameter of exceeding 80 μm in 5 square millimeter of a cross section of the master batch is 1.5 particle or less; and
a sum (m) of values obtained by multiplying a mole concentration of an alkali metal atom and a mole concentration of an alkaline earth metal atom each contained per g of the master batch by valencies thereof respectively is 60 μmol/g or more and 1710 μmol/g or less.

2. The master batch according to claim 1, wherein the alkali compound (A) is an alkali metal salt of carboxylic acid having 10 or less carbon atoms.

3. The master batch according to claim 1, wherein the alkali compound (A) is sodium acetate.

4. The master batch according to claim 1, wherein the polyamide (X) is polyamide comprising a diamine unit containing 70 mole % or more of a metaxylylenediamine unit and a dicarboxylic acid unit containing 70 mole % or more of an adipic acid unit.

5. The master batch according to claim 1, wherein the polyamide (X) is polyamide comprising a diamine unit containing 70 mole % or more of a metaxylylenediamine unit and a dicarboxylic acid unit containing 70 to 99 mole % of an adipic acid unit and 1 to 30 mole % of an isophthalic acid unit.

6. The master batch according to claim 1, wherein the polyamide (X) is polyamide comprising a diamine unit containing 70 mole % or more of a metaxylylenediamine unit and a dicarboxylic acid unit containing 70 mole % or more of a sebacic acid unit.

7. A production process for a polyamide resin composition prepared from the master batch according to claim 1, the production process comprising:
(a) polycondensing a diamine comprising 70 mole % or more of metaxylylenediamine and dicarboxylic acid in the presence of an alkali metal compound (C) and a phosphorus atom-containing compound (B) to obtain the polyamide (X);
(b) melting and kneading 14 to 0.5 parts by mass of a raw material alkali compound (A) and 100 parts by mass of the polyamide (X) obtained in step (a) with an extrusion equipment to obtain the master batch comprising the polyamide (X) and the alkali compound (A)'; and
(c) melting and kneading 0.5 to 20 parts by mass of the master batch obtained in step (b) and 99.5 to 80 parts by mass of the polyamide (X) obtained in the step (a) with an extrusion equipment,
to form a polyamide resin composition.

8. The production process according to claim 7, wherein:
the polyamide resin composition obtained in the step (c) satisfies the following equations (1) to (3):

$$0.03 \leq P < 0.32 \quad (1)$$

$$2.2 \leq M \leq 26.1 \quad (2)$$

$$5 < M/P \leq 200 \quad (3);$$

P represents a mole concentration (μmol/g) of a phosphorus atom contained per g of the polyamide resin composition; and
M represents a sum (μmol/g) of values obtained by multiplying a mole concentration (μmol/g) of an alkali metal atom and a mole concentration (μmol/g) of an alkaline earth metal atom each contained per g of the polyamide resin composition by valencies thereof respectively.

9. The production process according to claim 7, wherein:
an average particle diameter of the raw material alkali compound (A) is 150 μm or less; and
a proportion in which particles having a particle diameter of 300 μm or more are contained in the raw material alkali compound (A) is 5% or less.

10. The master batch according to claim 2, wherein the polyamide (X) is polyamide comprising a diamine unit containing 70 mole % or more of a metaxylylenediamine unit and a dicarboxylic acid unit containing 70 mole % or more of an adipic acid unit.

11. The master batch according to claim 2, wherein the polyamide (X) is polyamide comprising a diamine unit containing 70 mole % or more of a metaxylenediamine unit and a dicarboxylic acid unit containing 70 to 99 mole % of an adipic acid unit and 1 to 30 mole % of an isophthalic acid unit.

12. The master batch according to claim 2, wherein the polyamide (X) is polyamide comprising a diamine unit containing 70 mole % or more of a metaxylenediamine unit and a dicarboxylic acid unit containing 70 mole % or more of a sebacic acid unit.

13. The production process according to claim 8, wherein:
an average particle diameter of the raw material alkali compound (A) is 150 μm or less; and
a proportion in which particles having a particle diameter of 300 μm or more are contained in the raw material alkali compound (A) is 5% or less.

* * * * *